(12) United States Patent
Nagashima et al.

(10) Patent No.: US 7,725,289 B2
(45) Date of Patent: May 25, 2010

(54) STEP COUNTER AND METHOD OF COUNTING STEPS

(75) Inventors: Fumio Nagashima, Kawasaki (JP); Yoshiro Hada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 128 days.

(21) Appl. No.: 11/987,114

(22) Filed: Nov. 27, 2007

(65) Prior Publication Data

US 2008/0172204 A1 Jul. 17, 2008

(30) Foreign Application Priority Data

Jan. 15, 2007 (JP) ............................. 2007-006228

(51) Int. Cl.
*G01C 22/00* (2006.01)

(52) U.S. Cl. ..................... 702/160; 702/141; 702/94; 482/3; 482/8; 600/300; 600/547; 340/573.1; 342/352

(58) Field of Classification Search ................. 702/94, 702/141, 160; 482/3, 8; 73/1.79, 1.59, 384, 73/379.01, 379.02, 514.16; 600/300, 547; 340/573.1; 342/357.06, 357.14, 352

See application file for complete search history.

(56) References Cited

U.S. PATENT DOCUMENTS

| | | | | |
|---|---|---|---|---|
| 5,976,083 | A * | 11/1999 | Richardson et al. | .......... 600/300 |
| 6,135,951 | A * | 10/2000 | Richardson et al. | .......... 600/300 |
| 6,254,513 | B1 * | 7/2001 | Takenaka et al. | ................ 482/3 |
| 6,976,937 | B2 * | 12/2005 | Chen | ............................... 482/8 |
| 7,334,472 | B2 * | 2/2008 | Seo et al. | .................. 73/379.01 |
| 7,376,533 | B2 * | 5/2008 | Fujiwara | ..................... 702/160 |
| 7,512,517 | B2 * | 3/2009 | Tsubata | ....................... 702/160 |
| 2006/0020177 | A1 * | 1/2006 | Seo et al. | ..................... 600/300 |
| 2006/0220882 | A1 * | 10/2006 | Makino | .................... 340/573.1 |
| 2008/0077353 | A1 * | 3/2008 | Tsubata | ....................... 702/160 |

FOREIGN PATENT DOCUMENTS

| | | |
|---|---|---|
| JP | 6-11355 | 1/1994 |
| JP | 9-223214 | 8/1997 |
| JP | 2002-360549 | 12/2002 |

* cited by examiner

*Primary Examiner*—Carol S Tsai
(74) *Attorney, Agent, or Firm*—Staas & Halsey LLP

(57) ABSTRACT

An uniaxial acceleration sensor senses an acceleration. An analog to digital (AD) converter converts the acceleration into a digital sensor value. A square-value calculating unit calculates a square value of the sensor value. A zero-point determining unit determines whether the square value is zero and every time the square value becomes zero, instructs an energy calculating unit to output energy. The energy calculating unit calculates the energy by integrating the square value. Upon receiving instructions to output the energy, the energy calculating unit outputs the stored energy to a threshold comparing unit. The threshold comparing unit compares the energy with a predetermined threshold. A tentative walking processing unit counts the number of times the energy is equal to or larger than the predetermined threshold. A step calculating unit calculates steps by dividing a counter value of the tentative walking processing unit by two.

9 Claims, 7 Drawing Sheets

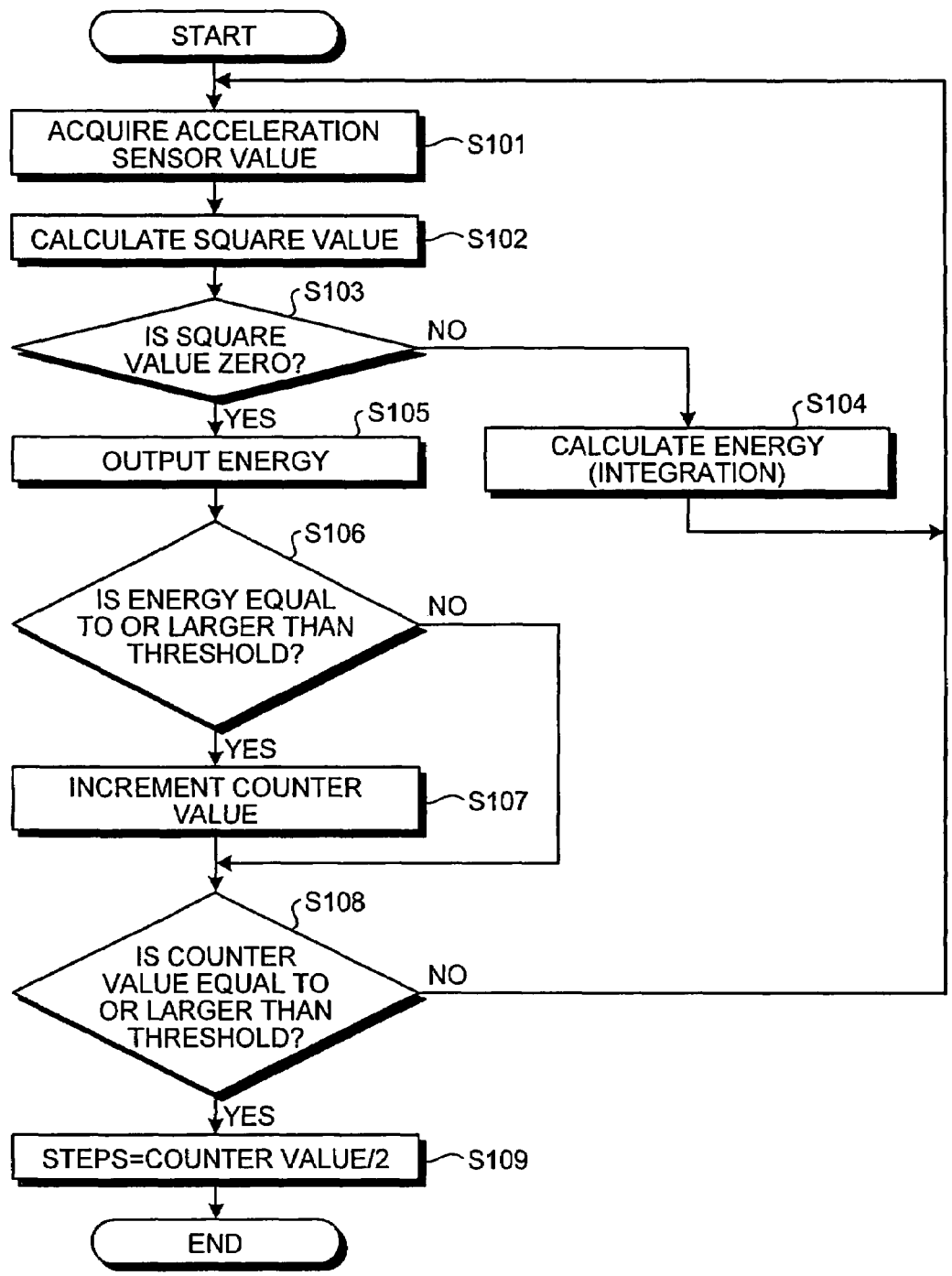

FIG.6
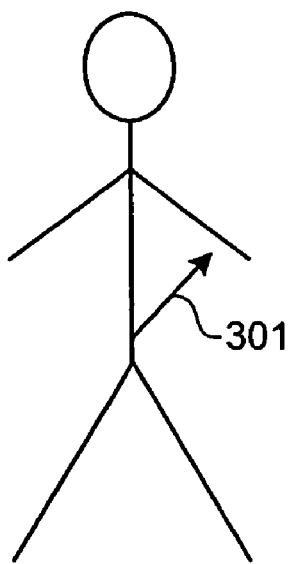
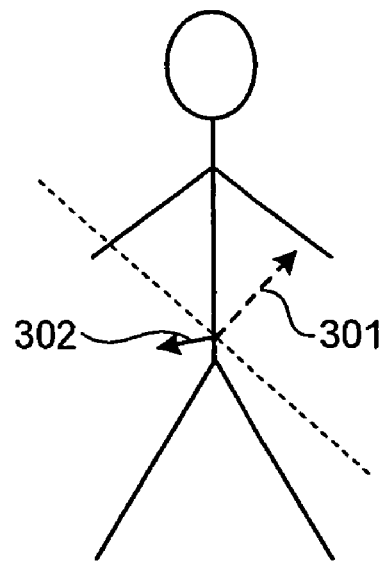

STEP COUNTER AND METHOD OF COUNTING STEPS

BACKGROUND OF THE INVENTION

1. Field of the Invention

The present invention relates to a step counter and a method of counting steps that count steps based on an acceleration generated due to vibrations at the time of walking, and, more particularly, to a step counter and a method of counting steps that realize accurate step counting by accurately discriminating walking from non-walking in a simple manner.

2. Description of the Related Art

In Japan, step counters which count steps are generally called "Manpo-kei", which is a registered trademark owned by Yamasa Tokei Keiki Co., Ltd. in Japan. Some step counters are provided with an acceleration sensor as described in Japanese Patent Application Laid-Open No. H9-223214. The step counter of this type is attached to a waist of a user, for example, and counts the number of steps according to changes in an acceleration generated due to walking. During steady walk of the user, the acceleration changes periodically. Therefore, the step counter can find the number of steps based on the number of peaks of sensor values of the acceleration sensor.

In one-step walking, a peak of a mountain and a bottom of a trough are included (hereinbelow "peak" may mean both the peak of a mountain and the bottom of a trough). Some step counters do not count a step when the difference between the peak of a mountain and the bottom of a trough (hereinafter also referred to as peak-to-peak difference) is below a predetermined threshold regarding that the corresponding acceleration change is caused by vibrations other than walking. Such a step counter does not count a relatively small vibration as a step. For example, a vibration caused by a toe touching the ground after a heel touches the ground is not counted as a step. Thus, accuracy of the results of counting can be enhanced.

Furthermore, Japanese Patent No. 3685741 describes a step counter in which plural thresholds are set to be compared with the peak-to-peak difference for the discrimination of walking from non-walking. This step counter changes a set threshold to a larger one after detecting a vibration with a large peak-to-peak difference, and to a smaller one after detecting a vibration with a small peak-to-peak difference.

The step counter described earlier, however, has some limitations in accuracy enhancement, since it counts the steps based only on the peak-to-peak difference of the sensor values detected by the acceleration sensor. Depending on a walking speed, the same peak-to-peak difference can indicate both the walking and the non-walking. Therefore, the determination based only on the comparison between the peak-to-peak difference and the threshold cannot always realize accurate step counting. In addition, if the step counter falls off and vibrates instantaneously, a peak may appear in the sensor values of the acceleration sensor. Then, the step counter may erroneously count one step according to this peak.

On the other hand, the step counter of Japanese Patent No. 3685741 changes the threshold according to the size of peak-to-peak difference. Therefore, the step counter can adjust itself to some extent to the fluctuation in a boundary between the walking and the non-walking according to the walking speed. However, for the accurate step counting, it is necessary to previously set an optimal combination of thresholds from a large number of combinations. In addition, when an instantaneous vibration not attributable to the walking exhibits a large peak-to-peak difference, it is still counted as a step.

SUMMARY OF THE INVENTION

It is an object of the present invention to at least partially solve the problems in the conventional technology.

According to one aspect of the present invention, a step counter counts steps based on an acceleration generated due to vibrations at the time of walking, and the step counter includes an acquiring unit that acquires an index value indicating an amount of the acceleration, an integrating unit that integrates the index value acquired by the acquiring unit to calculate energy, a determining unit that determines whether a zero point is reached where a direction of the acceleration reverses, a comparing unit that compares, when the determining unit determines that the zero point is reached, the energy calculated by the integrating unit with a predetermined threshold, a calculating unit that calculates a number of steps based on a number of times the energy is determined to be equal to or larger than the predetermined threshold by the comparing unit.

According to another aspect of the present invention, a method of counting steps based on an acceleration generated due to vibrations at the time of walking, includes acquiring an index value that indicates an amount of the acceleration, integrating the index value to calculate energy, determining whether a zero point is reached where a direction of the acceleration reverses, comparing, when it is determined that the zero point is reached, the energy with a predetermined threshold, calculating a number of steps based on a number of times the energy is determined to be equal to or larger than the predetermined threshold as a result of the comparing.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a flowchart of operations performed by the step counter according to the first embodiment;

FIG. 6 is an example for explaining zero point determination according to the second embodiment.

DETAILED DESCRIPTION OF THE PREFERRED EMBODIMENTS

Exemplary embodiments of the present invention are explained in detail below with reference to the accompanying drawings. In the following description, a step counter is explained as being attached to a waist of a user. The step counter of the present invention, however, can be attached to any position as far as the step counter can sense the acceleration of the walking of the user.

First Embodiment

Figure 1:
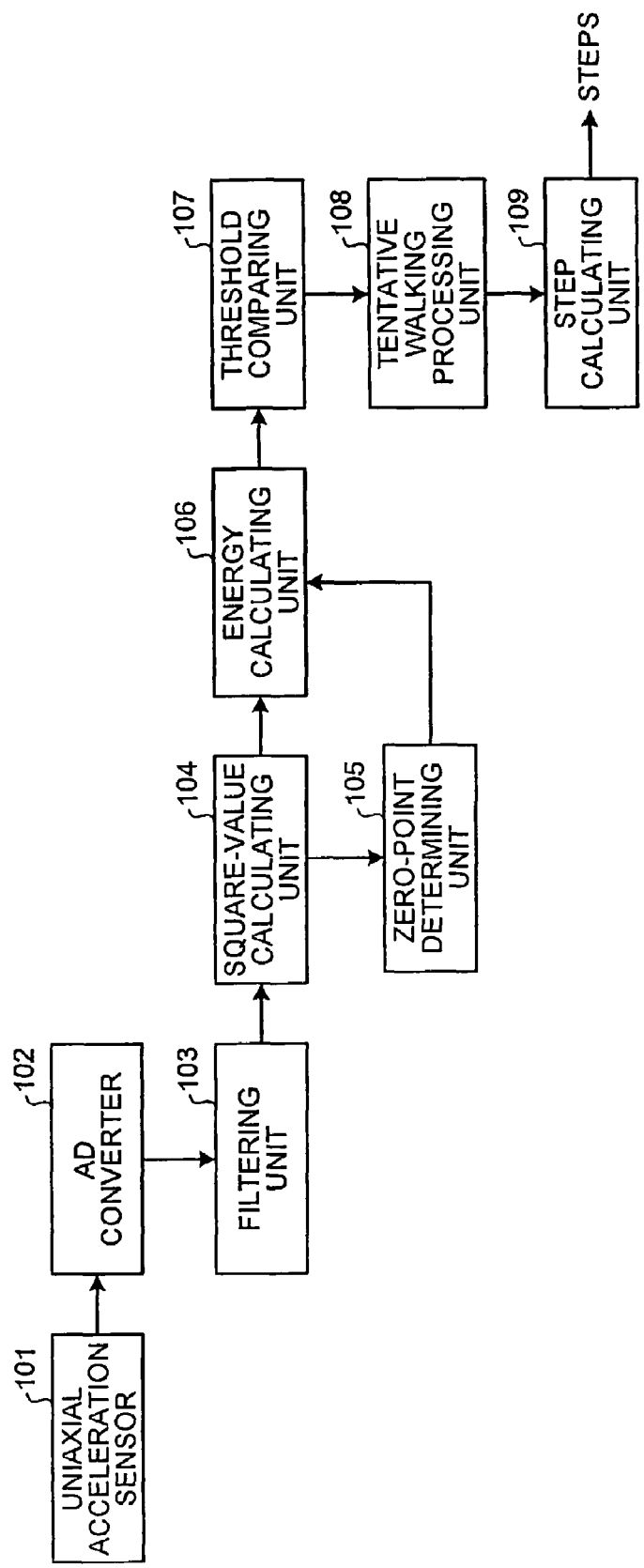
FIG. 1 is a block diagram of a step counter according to a first embodiment of the present invention.

FIG. 1 is a block diagram of a step counter according to a first embodiment of the present invention. As shown in FIG. 1, the step counter includes a uniaxial acceleration sensor 101, an analog to digital (AD) converter 102, a filtering unit 103, a square-value calculating unit 104, a zero-point determining unit 105, an energy calculating unit 106, a threshold comparing unit 107, a tentative walking processing unit 108, and a step calculating unit 109.

The uniaxial acceleration sensor 101 senses the vertical acceleration of a waist of the user while the user is walking and outputs the sensed acceleration to the AD converter 102. The uniaxial acceleration sensor 101 may be configured to sense acceleration other than the vertical acceleration, as far as the walking of the user can be discriminated from the non-walking based thereon. For example, the uniaxial acceleration sensor 101 may sense the acceleration in a forward-backward direction.

The AD converter 102 converts the acceleration sensed by the uniaxial acceleration sensor 101 into a digital sensor value and outputs to the filtering unit 103. Because the acceleration is a vector, the sensor value can be a positive or a negative value based on a direction of the acceleration.

The filtering unit 103 removes a noise, which is not related to the step counting, from the sensor value output from the AD converter 102, and outputs the filtered sensor value to the square-value calculating unit 104. In other words, the filtering unit 103 removes the sensor value that is not within a predetermined range as the noise and outputs the sensor value within the predetermined range to the square-value calculating unit 104.

The square-value calculating unit 104 squares the sensor value that is output from the filtering unit 103 to obtain a square value that indicates an amount of the acceleration. In other words, the square-value calculating unit 104 removes direction data of the acceleration, which is a vector, and calculates the square value that indicates the amount of the acceleration. Though the square value is used as an index value of the amount of the acceleration in the first embodiment, an absolute value of the acceleration can also be used.

The zero-point determining unit 105 determines whether the square value calculated by the square-value calculating unit 104 is zero. Each time the square value becomes zero, the zero-point determining unit 105 determines that the direction of acceleration has reversed, and instructs the energy calculating unit 106 to output calculated energy. Generally, during one-step walking, acceleration transits from the peak of the mountain (or the bottom of the trough), the bottom of the trough (or the peak of the mountain), and again to the peak of the mountain (or the bottom of the trough). During one-step walking, the acceleration direction reverses two times (in other words, the amount of the acceleration becomes zero two times) and at a point where the acceleration direction reverses (in other words, "zero point"), the square value becomes zero.

The energy calculating unit 106 integrates the square value that is calculated by the square-value calculating unit 104 and stores the integrated value as the energy. When the zero-point determining unit 105 instructs the energy calculating unit 106 to output the energy, the energy calculating unit 106 outputs the stored energy to the threshold comparing unit 107. Subsequently, the energy calculating unit 106 initializes the stored energy and starts integration of the square value that is newly calculated by the square-value calculating unit 104.

Therefore, the energy supplied from the energy calculating unit 106 to the threshold comparing unit 107 is energy obtained after the reversal of the acceleration direction until the next reversal of the acceleration direction. As mentioned earlier, because the acceleration direction reverses two times during one-step walking, if the energy output by the energy calculating unit 106 is generated due to walking, the output energy corresponds to a half step.

The threshold comparing unit 107 compares the energy output from the energy calculating unit 106 with a predetermined threshold and determines whether the energy is generated due to walking or not. Specifically, if the energy is equal to or larger than the predetermined threshold, the threshold comparing unit 107 determines that the energy is generated due to walking. If the energy is smaller than the predetermined threshold, the threshold comparing unit 107 determines that the energy is generated due to vibrations other than walking.

The tentative walking processing unit 108 counts a number of times the energy is determined to be equal to or larger than the predetermined threshold in the threshold comparing unit 107. The tentative walking processing unit 108 does not output the counter value until the counter value reaches a predetermined tentative walking cancellation value, because the count may represent an instantaneous vibration other than walking. When the counter value reaches the predetermined tentative walking cancellation value, the tentative walking processing unit 108 outputs the counter value to the step calculating unit 109 because repetitious acceleration changes can be regarded as representing the walking state.

The step calculating unit 109 divides the counter value, which is output from the tentative walking processing unit 108, by two, to calculate the number of steps. The counter value in the tentative walking processing unit 108 indicates the number of times the energy that corresponds to a half step becomes equal to or larger than the predetermined threshold. Therefore, the step calculating unit 109 calculates the number of steps by dividing the counter value by two.

FIG. 2 is a flowchart of operations performed by the step counter configured as described above. In the flowchart, the operations of the step counter attached to the waist of the user are explained.

After the user starts walking, the uniaxial acceleration sensor 101 senses the vertical acceleration of the waist of the user. The AD converter 102 carries out the analog to digital conversion of the sensed acceleration and obtains the sensor value (step S101). The filtering unit 103 removes the noise, which is not related to the step counting, from the sensor value and outputs the filtered value to the square-value calculating unit 104. The square-value calculating unit 104 calculates the square value which indicates the amount of the acceleration (step S102).

The zero-point determining unit 105 determines whether the square value calculated by the square-value calculating unit 104 is zero or not (step S103). When the square value is not zero (No in step S103), it means that the acceleration direction does not reverse at this point (in other words, this is not a zero point). Therefore, the energy calculating unit 106 integrates the square value to calculate the energy from a previous zero point up to a current point (step S104). The calculated energy is stored in the energy calculating unit 106. Subsequently, the energy calculating unit 106 continues to integrate a subsequent square value of a sensor value that indicates acceleration sensed by the uniaxial acceleration sensor 101 to update the energy.

Upon determining that the square value is zero (Yes in step S103), the zero-point determining unit 105 determines that the acceleration direction is reversed and instructs the energy calculating unit 106 to output the stored energy. Upon receiving the instruction, the energy calculating unit 106 outputs to the threshold comparing unit 107, the energy that is obtained by integrating the square value of the sensor value from the previous zero point (step S105). Then, the energy in the energy calculating unit 106 is initialized and the integration of the square value of the sensor value is started anew.

On receiving an input of the energy, the threshold comparing unit 107 compares the energy with the predetermined threshold (step S106). If the energy is equal to or larger than the predetermined threshold (Yes in step S106), it is determined that the energy is generated due to walking and the counter value in the tentative walking processing unit 108 is incremented (step S107).

The first embodiment, instead of comparing the threshold with the peak-to-peak difference of the sensor value of the acceleration obtained by the uniaxial acceleration sensor 101, compares the threshold with the energy that is obtained by integrating the square value of the sensor value that indicates the amount of the acceleration. Thus, the step counter does not determine that the user is in the walking state simply because the peak-to-peak difference of the sensor value is large. Instead, the step counter determines that the user is in the walking state when the overall acceleration between the points where the acceleration direction reverses (i.e., zero points) is high. Generally, if strong instantaneous vibrations are generated, the acceleration peak becomes high. Conventional step counters are likely to determine that the user is in the walking state based on such a peak. On the contrary, the step counter according to the present embodiment does not determine that the user is in the walking state even when the sensed peak is higher than the peak generated by walking, if the acceleration changes merely instantaneously.

Further, the step counter according to the first embodiment is easily realizable since the setting of only one threshold for the energy obtained by integration of the square value of the sensor value is enough. Thus, the step counter according to the first embodiment can realize accurate step counting by accurately discriminating the walking from the non-walking in a simple manner.

If the energy is determined to be smaller than the predetermined threshold as a result of comparison between the energy and the predetermined threshold (No in step S106), the tentative walking processing unit 108 determines whether the counter value reaches the predetermined tentative walking cancellation value or not without incrementing the counter value (step S108). On the other hand, when the counter value in the tentative walking processing unit 108 is incremented, it is determined whether the counter value has reached the predetermined tentative walking cancellation value in a similar manner (step S108).

If the counter value in the tentative walking processing unit 108 has not reached the predetermined tentative walking cancellation value (No in step S108), it is determined that there is still a possibility that the energy counted as the energy generated due to walking is actually generated due to the instantaneous vibration. Hence, at this point, the number of steps is not calculated based on the counter value, and the process from the acquisition of a sensor value up to the comparison between the energy and the threshold is repeated. The counter value is not cleared and the user is determined to be in a tentative walking state. Consequently, the step counter continues to count the number of times the energy becomes equal to or larger than the threshold.

Subsequently, when the counter value reaches the predetermined tentative walking cancellation value (Yes in step S108), the step counter determines that the user is in the walking state based on the detected repetitious changes in acceleration. Then, the counter value in the tentative walking processing unit 108 is supplied to the step calculating unit 109. The step calculating unit 109 divides the counter value by two thereby calculating the number of steps (step S109).

As described earlier, the one-step walking corresponds to a transition of sensor values from the peak of the mountain (or the bottom of the trough) to the peak of the next mountain (or the bottom of the next trough). Therefore, the counter value tends to be an odd value. When the counter value is odd, the step calculating unit 109 adds a count of a peak (or a trough) at a start time or an end time of walking, in other words, adds one to the counter value before dividing the counter value by two. In other words, the step calculating unit 109 rounds up a fractional part of the quotient to obtain the number of steps.

Figure 3A:
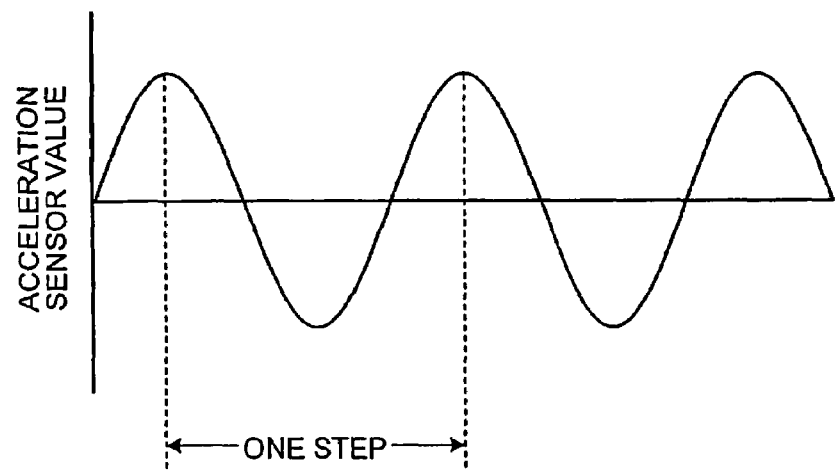
FIGS. 3A and 3B are specific examples of step counting according to the first embodiment.
Figure 3B:
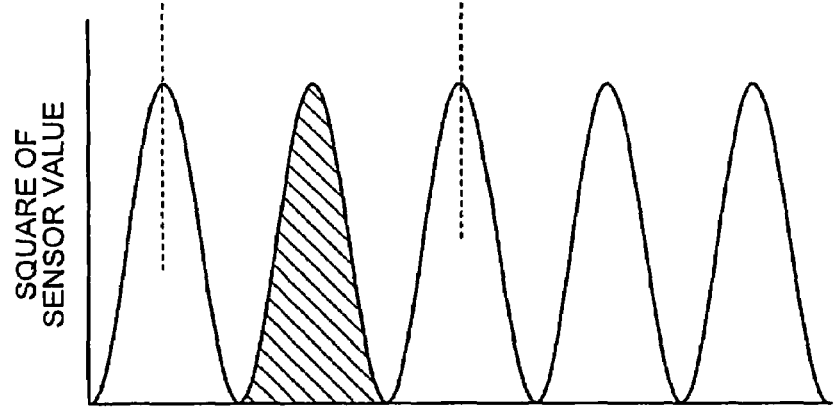

For example, as shown in FIGS. 3A and 3B, when the sensor value at the time of walking exhibits a periodic waveform, the waveform of the square value of the sensor value comes to have double cycles of the waveform of the sensor value. The square value from the zero point to the zero point is integrated and calculated as energy. Thus, a shaded area in FIG. 3B is calculated as the energy. If the energy is equal to or larger than the threshold, the counter value in the tentative walking processing unit 108 is incremented. During one step, that is, from the peak of the mountain up to the peak of the next mountain of the sensor value, the counter value is incremented only by one. Thus, in the step calculating unit 109, a counter value one is divided by two and the number of steps is calculated. However, as is clear from FIG. 3B, combination of the peak energies at the start time and the end time of one step corresponds to one increment of the counter value. Thus, when the counter value is divided by two and the fractional part of the quotient is rounded up, the number of steps can be obtained.

In the actual walking, obtained sensor values may not be as orderly as the waveforms shown in FIGS. 3A and 3B. Therefore, it is possible to neglect the peak at the start time and the end time of walking, and round off the quotient of the counter value to the whole number in calculating the number of steps. Alternatively, it is possible to process the acceleration sensed by the uniaxial acceleration sensor 101 so that the one-step walking starts and ends at the zero point of the sensor value.

Figure 4:
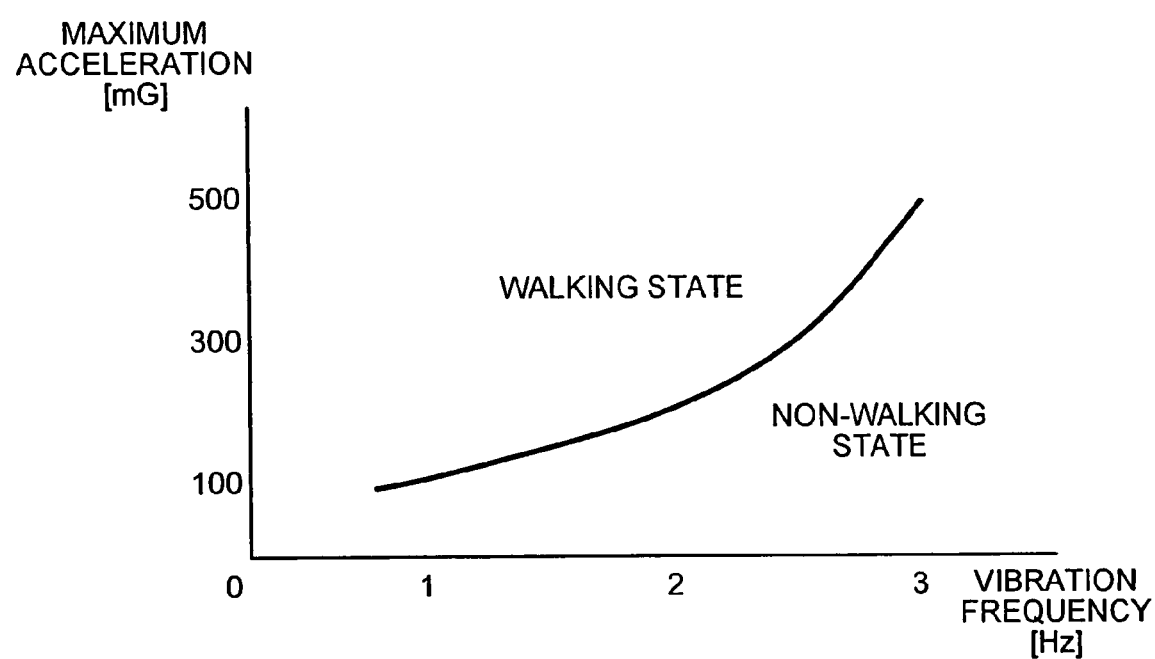
FIG. 4 is a graph indicating changes in a boundary between a walking and a non-walking according to the first embodiment.

In the present embodiment, the walking state is discriminated from the non-walking state based on the size of energy obtained by the integration of the amount of acceleration. When the method of the present embodiment is applied, the peak-to-peak difference which is taken as the boundary between the walking state and the non-walking state increases as the vibration frequency increases as can be seen from the results of experiments shown in FIG. 4. In FIG. 4, a horizontal axis indicates the vibration frequency of vibrations given to the step counter and a vertical axis indicates the peak-to-peak difference of the acceleration sensor taken as the boundary between the walking state and the non-walking state. As shown in FIG. 4, if the vibration frequency, in other words, a walking speed increases, the boundary, above which the state is determined to be the walking state, increases accordingly. Thus, it can be seen that the step counter according to the present invention does not determine that the user is in the walking state even when the peak-to-peak difference of the acceleration sensor is relatively large if the walking speed is high.

The explanation above is mathematically proven to be appropriate. Thus, it can be seen that the accuracy of the step counting is enhanced. Specifically, if a movement of the waist of the user at the time of walking is approximated to a circular movement with a forward foot as a center, a vertical displacement x of the waist of the user can be obtained as in an expression (1):

$$x = h \sin \omega t \tag{1}$$

where t is time, ω is angular speed, and h is a maximum vertical displacement of the waist at the time of walking. Here, vertical acceleration a of the waist of the user can be obtained by two times differentiation of the displacement x, which can be represented as:

$$a = -\omega^2 h \sin \omega t \tag{2}$$

In the expression (2), the acceleration a is in proportion to the square of the angular speed ω. This means that the acceleration is increased in proportion to the square of the walking speed at the time of walking. As the walking speed increases, the acceleration that is determined as the walking state also increases in proportion to the square of the walking speed. In the experimental results shown in FIG. 4, a curved line is shown that resembles a quadratic function of the vibration frequency and a maximum acceleration, which shows that the step counter according to the first embodiment can accurately discriminate the walking state from the non-walking state.

The step counter according to the first embodiment senses the acceleration by the uniaxial acceleration sensor; integrates the amount of acceleration between the zero points where the acceleration direction reverses thereby calculating the energy; determines that the calculated energy is generated due to the walking of the user when the energy is equal to or larger than the predetermined threshold; and calculates the number of steps. Thus, the step counter according to the first embodiment can discriminate the vibration by the walking from vibration other than walking, even though such vibration cannot be discriminated from the vibration by the walking simply based on the peak-to-peak difference of the amount of acceleration, whereby the step counter can realize accurate step counting by accurately discriminating the walking from the non-walking in a simple manner.

Second Embodiment

A step counter according to a second embodiment of the present invention is characterized in that a biaxial acceleration sensor is used as the acceleration sensor and the energy is calculated by integration of a square sum of accelerations in two axes.

Figure 5:
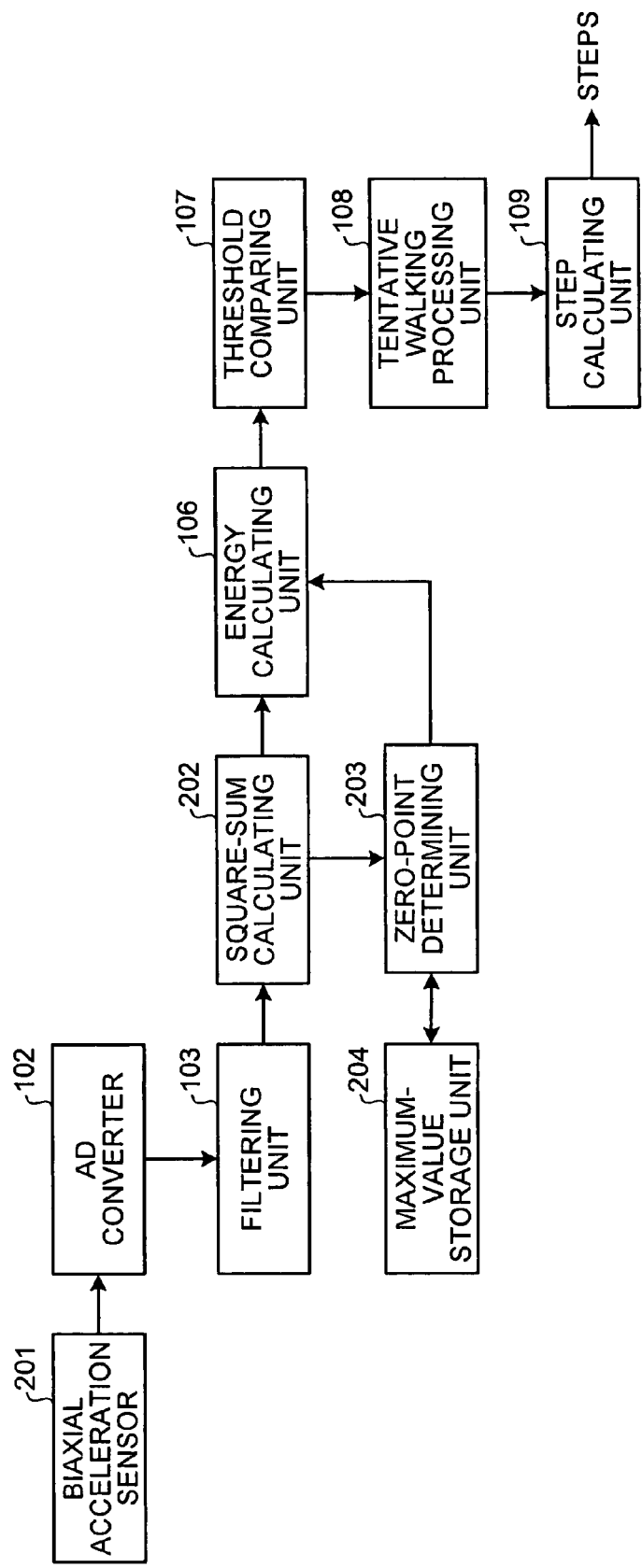
FIG. 5 is a block diagram of a step counter according to a second embodiment of the present invention.

FIG. 5 is a block diagram of the step counter according to the second embodiment. As shown in FIG. 5, same reference numerals are assigned to units similar to those shown in FIG. 1 and an explanation thereof is not repeated. As shown in FIG. 5, the step counter includes a biaxial acceleration sensor 201, an AD converter 102, a filtering unit 103, a square-sum calculating unit 202, a zero-point determining unit 203, a maximum-value storage unit 204, an energy calculating unit 106, a threshold comparing unit 107, a tentative walking processing unit 108, and a step calculating unit 109.

The biaxial acceleration sensor 201 senses the acceleration of the waist in the vertical direction and a forward-backward direction while the user is walking and outputs the sensed accelerations of the respective directions to the AD converter 102. Alternatively, the biaxial acceleration sensor 201 may be configured to sense accelerations in different two axes, such as in the vertical direction and the right-left direction, or forward-backward direction and the right-left direction, as far as the biaxial acceleration sensor 201 can sense the accelerations which allow for the discrimination between the walking and the non-walking of the user.

The square-sum calculating unit 202 squares each of the sensor values of two directions that are output from the filtering unit 103 and adds the resulting values, thereby obtaining a square sum that indicates an amount of the accelerations in two axes. More specifically, the square-sum calculating unit 202 removes direction data from each of the accelerations, which are vectors, in two axes and calculates the square sum which indicates the amount of accelerations in two axes by itself.

By using the respective sensor values indicating the accelerations in two axes, the zero-point determining unit 203 determines whether the zero point has been reached, at which the acceleration direction reverses. Every time the zero point appears, the zero-point determining unit 203 instructs the energy calculating unit 106 to output the calculated energy. Specifically, the zero-point determining unit 203 calculates an inner product of each of the sensor values of the accelerations in two axes that are stored in the maximum-value storage unit 204 and each of current sensor values of the accelerations in two axes, and determines that the acceleration direction has reversed when the obtained inner product is less than zero. In the second embodiment, the accelerations in two axes sometimes do not attain zero simultaneously because the biaxial acceleration sensor 201 is used. Thus, the square sum that is calculated by the square-sum calculating unit 202 does not always become zero at the zero point where the acceleration reverses. Therefore, the zero-point determining unit 203 determines that the point where the acceleration direction is at an angle wider than 90 degrees relative to the direction of maximum acceleration stored in the maximum-value storage unit 204 is the zero point at which the acceleration direction reverses.

The maximum-value storage unit 204 stores each of sensor values of accelerations in two axes corresponding to the maximum value of the square sum after the zero-point determining unit 203 determines that zero point is reached. Therefore, after the zero-point determining unit 203 determines that the zero point is reached, the maximum-value storage unit 204 always stores immediately previous sensor values for a while. After the square sum reaches its peak, the maximum-value storage unit 204 stores sensor values at the time the square value attains its peak. The sensor values stored by the maximum-value storage unit 204 are used by the zero-point determining unit 203 for the zero-point determination.

In the second embodiment, the biaxial acceleration sensor 201 senses the accelerations in two axes. Because the accelerations in two axes are not completely synchronized during the walking of the user, the time when the square value becomes zero cannot be determined as the zero point, dissimilar to the first embodiment. The zero-point determining unit 203 determines as the zero point, the point where the acceleration forms an angle wider than 90 degrees relative to the maximum acceleration.

To be specific, when the acceleration becomes maximum, the square sum calculated by the square-sum calculating unit 202 also becomes maximum. Thus, the maximum-value storage unit 204 stores therein the sensor values of the accelerations in two axes at the time when the square sum becomes maximum. In other words, while the square sum increases after the zero-point determining unit 203 detects the zero point, the sensor values are updated to values corresponding to the newly-calculated square sum and stored in the maximum-value storage unit 204. After the square sum reaches its peak, the sensor values corresponding to the square sum at the peak time are stored in the maximum-value storage unit 204.

For example, in the example shown in FIG. 6, if a vector 301 represents an acceleration at the peak time, the sensor values stored in the maximum-value storage unit 204 are sensor values of two axes corresponding to the vector 301.

Next, the zero-point determining unit 203 calculates the inner product of the current acceleration and the acceleration at the peak time and determines that the acceleration direction is reversed when the inner product becomes less than zero. For example, in the example shown in FIG. 6, when an acceleration vector 301 at the peak time forms an angle wider than 90 degrees with a current acceleration vector 302, the zero-point determining unit 203 determines that the zero point is reached.

Thus, even when the biaxial acceleration sensor 201 is used, the energy can be output from the energy calculating unit 106 to the threshold comparing unit 107 at the time when the square sum of the half step is integrated. Furthermore, even if a triaxial acceleration sensor is used, the zero point determination can be performed in a similar manner.

Figure 7:
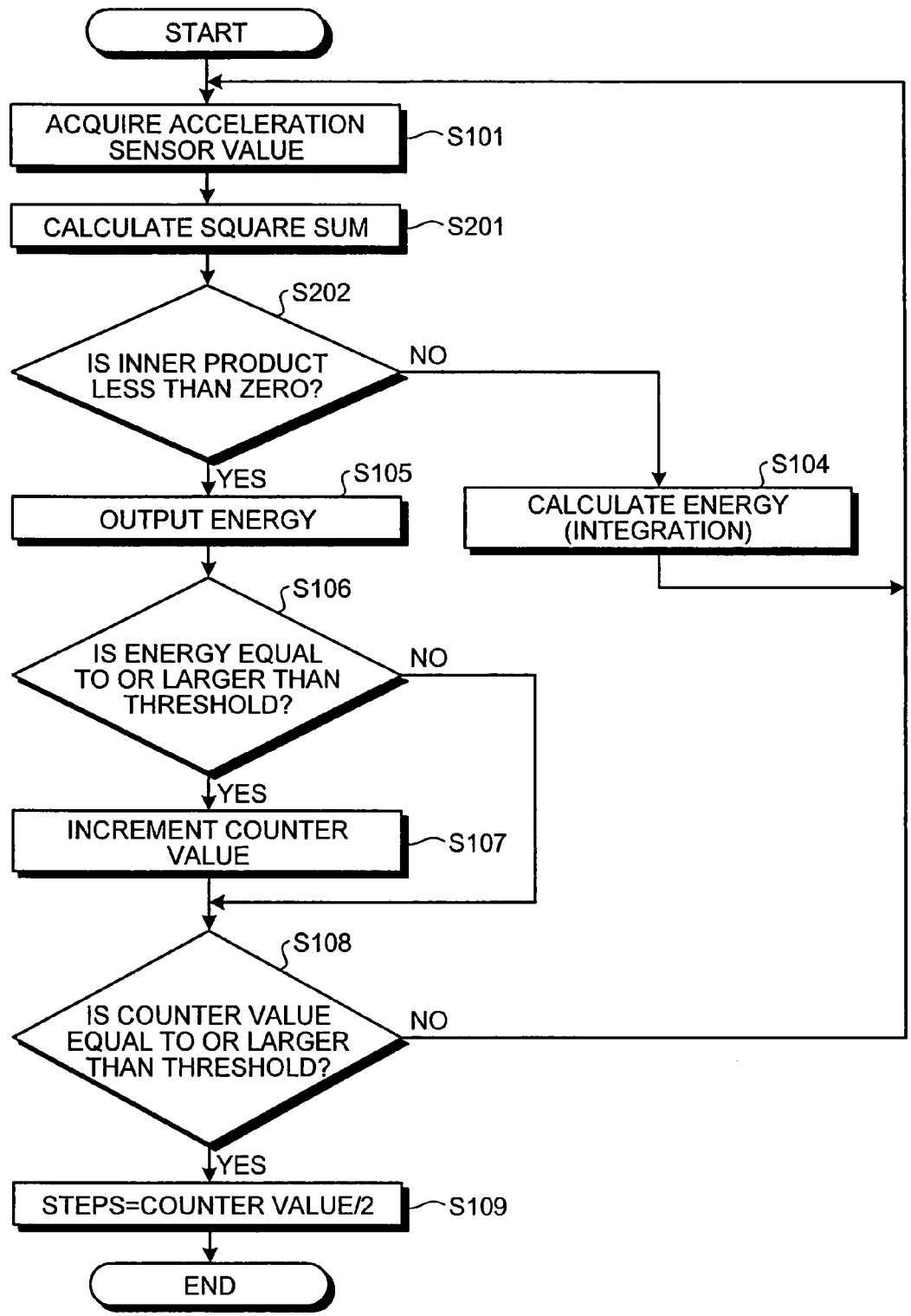
FIG. 7 is a flowchart of operations performed by the step counter according to the second embodiment.

Operations of the step counter configured as described above is described with reference to the flowchart of FIG. 7. In FIG. 7, the same reference numerals are assigned to the units similar to those shown in FIG. 2.

After the user starts walking, the biaxial acceleration sensor 201 senses the accelerations of the waist of the user in the vertical direction and in the forward-backward direction. The AD converter 102 carries out the analog to digital conversion of the sensed accelerations and obtains the sensor values of the accelerations in two axes (step S101). The filtering unit 103 removes the noise, which is not related to the step counting, from the sensor values, and outputs the filtered values to the square-sum calculating unit 202. The square-sum calculating unit 202 calculates the square sum that indicates the amount of the acceleration (step S201).

The zero-point determining unit 203 reads out the sensor values that correspond to the maximum acceleration and are stored in the maximum-value storage unit 204, calculates the inner product of the current sensor values that are used for calculating the square sum and the sensor values that correspond to the maximum acceleration, and determines whether the inner product is less than zero (step S202). When the inner product is not less than zero as a result of determination (No in step S202), this point is not the point at which the acceleration direction reverses (i.e., zero point). Therefore, the energy calculating unit 106 integrates the square sum and calculates the energy from the previous zero point up to the current point (step S104). The calculated energy is stored in the energy calculating unit 106. Subsequently, the energy calculating unit 106 continues to integrate the square sum of the sensor values that indicate the accelerations sensed by the biaxial acceleration sensor 201, and updates the energy.

When the angle between the maximum acceleration and the current acceleration exceeds 90 degrees and the inner product of the two vectors becomes less than zero (Yes in step S202), the zero-point determining unit 203 determines that the acceleration is reversed and instructs the energy calculating unit 106 to output the stored energy. Upon receiving the instruction, the energy calculating unit 106 outputs to the threshold comparing unit 107, the energy that is obtained by integrating the square sum of the sensor values from the previous zero point (step S105). Then, the energy in the energy calculating unit 106 is initialized and integration of the square sum of the sensor value is started again.

On receiving the input of the energy, the threshold comparing unit 107 compares the energy with the predetermined threshold (step S106). If the energy is equal to or larger than the predetermined threshold (Yes in step S106), it is determined that the energy is generated due to walking and the counter value in the tentative walking processing unit 108 is incremented (step S107).

The step counter according to the second embodiment, instead of comparing the threshold with the peak-to-peak difference of the sensor values of the accelerations obtained by the biaxial acceleration sensor 201, compares the threshold with the energy obtained by the integration of the square sum of the sensor values which indicate the amount of the accelerations. Therefore, the step counter does not determine that the user is in the walking state simply because the peak-to-peak differences of the sensor values are large. Instead, the step counter determines that the user is in the walking state when the overall acceleration is large between the points where the direction of acceleration is reversed (i.e., zero points). Generally, the peak of the acceleration increases when the strong instantaneous vibration is generated. The conventional step counters are likely to determine that the user is in the walking state based on such a peak. On the contrary, the step counter according to the second embodiment does not determine that the user is in the walking state even when the sensed peak value is higher than the peak generated by walking, if the acceleration changes merely instantaneously.

Further, the step counter according to the second embodiment is easily realizable since the setting of only one threshold for the energy obtained by integration of the square sum of the sensor values is enough. Thus, the step counter according to the second embodiment can realize accurate step counting by accurately discriminating the walking from the non-walking in a simple manner.

If the energy is determined to be less than the predetermined threshold as a result of comparison between the energy and the predetermined threshold (No in step S106), the tentative walking processing unit 108 determines whether the counter value reaches the predetermined tentative walking cancellation value or not without incrementing the counter value (step S108). When the counter value in the tentative walking processing unit 108 is incremented, it is determined whether the counter value has reached the predetermined tentative walking cancellation value in a similar manner (step S108).

If the counter value in the tentative walking processing unit 108 has not reached the predetermined tentative walking cancellation value (No in step S108), it is determined that there is still a possibility that the energy counted as the energy generated due to walking is actually generated due to the instantaneous vibration. Hence, at this point, the number of steps is not calculated based on the counter value, and the process from the acquisition of a sensor value up to the comparison between the energy and the threshold is repeated. The counter value is not cleared and the user is determined to be in a tentative walking state. Consequently, the step counter continues to count the number of times the energy becomes equal to or larger than the threshold.

Thus, the comparison between the threshold and the energy is performed. Subsequently, when the counter value, which indicates the number of times the energy becomes equal to or larger than the predetermined threshold, reaches the predetermined tentative walking cancellation value (Yes in step S108), the step counter determines that the user is in the walking state based on the detected repetitious changes in acceleration. Then, the counter value in the tentative walking processing unit 108 is supplied to the step calculating unit 109. The step calculating unit 109 divides the counter value by two thereby calculating the number of steps (step S109).

As can be seen from the above, the step counter according to the second embodiment senses the accelerations by the biaxial acceleration sensor; integrates the amount of the acceleration between the zero points where the direction of acceleration reverses to calculate the energy; determines that the energy is generated by the walking of the user when the energy is equal to or larger than the predetermined threshold; and calculates the number of steps. Thus, the step counter can discriminate the vibration by the walking from the instantaneous vibration which is indistinguishable from the vibration by the walking based on the peak-to-peak difference of the acceleration, whereby the step counter can realize the accurate step counting by discriminating the walking from the non-walking accurately in a simple manner. Further, since the direction of acceleration is detected in two axes, the walking state can be discriminated from the non-walking state more accurately.

In the first and the second embodiments, the acceleration is sensed by the uniaxial acceleration sensor or the biaxial acceleration sensor. Alternatively, the acceleration may be sensed by a triaxial acceleration sensor, for example, in the vertical direction, in the forward-backward direction, and in the left-right direction. In this case, the square sum of the sensor values of three axes may be found and integrated, and the obtained integrated value may be employed as the energy.

The step counter having a configuration according to one aspect of the present invention integrates the index value of the acceleration to calculate the energy, and finds the number of steps based on the number of times the energy is equal to or larger than the predetermined threshold. Therefore, the step counter does not determine that the user is in the walking state even if there is an instantaneous increase or decrease in the acceleration. An instantaneous vibration and a vibration caused by the walking can be discriminated from one another even if detected peaks of acceleration are of the same level. Thus, the step counter can realize accurate step counting by accurately discriminating the walking from the non-walking in a simple manner.

Further, the step counter having a configuration according to one aspect of the present invention employs the square value of the acceleration sensed by the uniaxial acceleration sensor as the index value. Therefore, the step counter can calculate the energy based on the amount of acceleration, which is a vector, by performing a simple calculation, whereby the walking and the non-walking can be discriminated from each other accurately.

Still further, the step counter having a configuration according to one aspect of the present invention employs the absolute value of the acceleration sensed by the uniaxial acceleration sensor as the index value. Therefore, the step counter can calculate the energy based on the amount of acceleration itself, whereby the walking and the non-walking can be discriminated from each other accurately.

Still further, the step counter having a configuration according to one aspect of the present invention employs the square sum of the accelerations in plural directions sensed by the biaxial acceleration sensor. Therefore, the step counter can obtain a comprehensive index value based on the accelerations in at least two directions, and at the same time, the step counter can calculate the energy by finding one index value based on the sensor values obtained with respect to at least two directions, whereby the walking and the non-walking can be discriminated from each other more accurately.

Still further, the step counter having a configuration according to one aspect of the present invention determines that the zero point is reached when the index value is zero. Therefore, when the uniaxial acceleration sensor is employed, for example, a time point where the sensor value changes from a negative value to a positive value or from a positive value to a negative value can be set as the zero point, whereby the reversing of the acceleration direction in one-step walking can be detected accurately.

Still further, the step counter having a configuration according to one aspect of the present invention determines that the zero point is reached when an acceleration takes such a value that the inner product of which and the acceleration corresponding to the peak of the index value becomes less than zero. Therefore, when the biaxial acceleration sensor is employed, for example, the zero point can be set to a point where a vector of the maximum acceleration and a vector of the current acceleration form an angle wider than 90 degrees, whereby the reversing of the acceleration direction in one-step walking can be detected accurately.

Still further, the step counter having a configuration according to one aspect of the present invention divides the number of times the energy becomes equal to or larger than the predetermined value by two to calculate the number of steps. Therefore, the step counter can find the number of steps properly even when the employed index value has a cycle which is double that of the sensor value of the actual acceleration.

Still further, the step counter having a configuration according to one aspect of the present invention counts the number of steps by rounding up the fractional part of the quotient. Therefore, a peak at the start time and the end time of the one-step walking can be counted as the step, whereby the steps can be counted more accurately.

Still further, a method according to one aspect of the present invention integrates the index value of the acceleration to calculate the energy, and find the number of steps based on the number of times the energy becomes equal to or larger than the predetermined threshold. Therefore, an instantaneous increase or decrease of the acceleration does not result in the determination of the walking state. An instantaneous vibration and a vibration caused by the walking can be discriminated from one another even if detected peaks of acceleration are of the same level. Thus, the method can realize accurate step counting by accurately discriminating the walking from the non-walking in a simple manner.

Thus, according to the present invention, the walking is discriminated from the non-walking accurately in a simple manner, and the number of steps can be counted with a high accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A step counter that counts steps based on an acceleration generated due to vibrations at the time of walking, the step counter comprising:
   an acquiring unit that acquires an index value indicating an amount of the acceleration;
   an integrating unit that integrates the index value acquired by the acquiring unit to calculate energy;
   a determining unit that determines whether a zero point is reached where a direction of the acceleration reverses;
   a comparing unit that compares, when the determining unit determines that the zero point is reached, the energy calculated by the integrating unit with a predetermined threshold; and a calculating unit that calculates a number of steps based on a number of times the energy is determined to be equal to or larger than the predetermined threshold by the comparing unit.

2. The step counter according to claim 1, wherein the acquiring unit includes an uniaxial acceleration sensor that senses the acceleration of one direction, and the acquiring unit acquires a square value of the acceleration sensed by the uniaxial acceleration sensor as the index value.

3. The step counter according to claim 1, wherein the acquiring unit includes an uniaxial acceleration sensor that senses the acceleration of one direction, and the acquiring unit acquires an absolute value of the acceleration sensed by the uniaxial acceleration sensor as the index value.

4. The step counter according to claim 1, wherein the acquiring unit includes an acceleration sensor that senses the acceleration of at least two directions, and the acquiring unit acquires a square sum of accelerations in plural directions sensed by the acceleration sensor as the index value.

5. The step counter according to claim 1, wherein the determining unit determines that the zero point is reached when the index value acquired by the acquiring unit attains zero.

6. The step counter according to claim 1, wherein the determining unit determines that the zero point is reached when an inner product of an acceleration and the acceleration that corresponds to a peak of the index value acquired by the acquiring unit becomes less than zero.

7. The step counter according to claim 1, wherein the calculating unit calculates the number of steps by dividing by two, the number of times the energy is determined to be equal to or larger than the predetermined threshold.

8. The step counter according to claim 7, wherein the calculating unit calculates the number of steps by rounding up a fractional part of a quotient when the number of times cannot be divided by two.

9. A method of counting steps based on an acceleration generated due to vibrations at the time of walking, comprising:

acquiring an index value that indicates an amount of the acceleration;

integrating the index value to calculate energy;

determining whether a zero point is reached where a direction of the acceleration reverses;

comparing, when it is determined that the zero point is reached, the energy with a predetermined threshold; and calculating, by a processor, a number of steps based on a number of times the energy is determined to be equal to or larger than the predetermined threshold as a result of the comparing.

* * * * *